3,413,299
3',3'-DI-SUBSTITUTED[SPIRO-INDOLINE-3,2'-OXIRAN]-2 ONES AND DERIVATIVES
William C. Anthony, Kalamazoo, Mich., assignor to The Upjohn Company, Kalamazoo, Mich., a corporation of Delaware
No Drawing. Continuation-in-part of application Ser. No. 294,230, July 11, 1963. This application Oct. 16, 1964, Ser. No. 404,493
12 Claims. (Cl. 260—295)

ABSTRACT OF THE DISCLOSURE

Certain new 3',3'-disubstituted-spiro-[indoline-3,2'-oxiran]-2-ones active as sedatives are prepared by epoxidation of a 3-(di-substituted-methylene)oxindole with hydrogen peroxide in the presence of a basic catalyst. The indole nitrogen may have a lower alkyl group substituent and the 3' carbon of the oxiran ring is substituted by lower alkyl, aryl, aralkyl, or pyridyl groups.

---

This application is a continuation-in-part of application Ser. No. 294,230, filed July 11, 1963, now abandoned.

This invention pertains to novel organic compounds and to a novel process for preparing the same. More particularly, the invention is directed to novel 3',3'-disubstituted-spiro-[indoline-3,2'-oxiran]-2-ones obtained by a novel epoxidation of 3-(di-substitutedmethylene)oxindoles.

It has now been found in accordance with this invention that 3-(di-substitutedmethylene)oxindoles, when treated with hydrogen peroxide in the presence of a basic catalyst, are epoxidized to form the novel 3',3'-disubstituted-spiro[indoline-3,2'-oxiran]-2-ones of this invention represented by the structural formula:

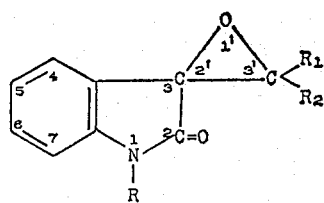

I wherein R is selected from the group consisting of hydrogen and lower-alkyl, and $R_1$ and $R_2$ are selected from the group consisting of lower-alkyl, aryl, aralkyl, and pyridyl. In accordance with the invention, the term "lower-alkyl" includes, for example, methyl, ethyl, propyl, butyl, hexyl, octyl, and isomeric forms thereof. The term "aryl" includes, for example, phenyl, substituted phenyl, and naphthyl. Illustrative substituted phenyls include alkylphenyl, for example, tolyl, xylyl, ethylphenyl, mesityl, and the like; halophenyl, for example, chlorophenyl, bromophenyl, dichlorophenyl, triiodophenyl, and the like; and alkoxyphenyl, for example, methoxyphenyl, ethoxyphenyl, diethoxyphenyl, trimethoxyphenyl, butoxyphenyl, and the like. The term "aralkyl" includes, for example, benzyl, α-methylbenzyl, phenethyl, and the like.

The novel 3',3'-disubstituted-spiro[indoline-3,2'-oxiran]-2-ones of this invention are prepared by epoxidation of a 3-(di-substitutedmethylene)oxindole with aqueous hydrogen peroxide in the presence of a basic catalyst. The reaction is effected in the presence of an inert reaction medium, advantageously at a temperature in the range of about 15° C. to about 80° C., preferably in the range of about 20° C. to about 30° C. Illustratively, suitable inert reaction media include alkanols such as methanol (preferred), ethanol, isopropyl alcohol, butanol, and the like. Advantageously, the molar ratio of 3-(di-substitutedmethylene)oxindole to hydrogen peroxide can range from about 1:1 to about 1:2.5 or even higher or lower. Preferably, the molar ratio is in the range of about 1:1.25 to about 1:2. Advantageously, the basic catalyst is an alkali metal hydroxide, such as lithium, sodium, or potassium hydroxide. Likewise, alkali metal carbonates such as sodium carbonate and potassium carbonate, and alkaline earth hydroxides such as barium hydroxide and calcium hydroxide can be used.

The compounds of the invention are recovered by conventional methods such as filtration, neutralization of the base, evaporation of liquid, and recrystallization. In general, the compounds are recovered by filtering the reaction mixture, neutralizing the filtrate with acid, concentrating the mixture, and crystallizing.

The 3-(di-substituted methylene)oxindoles employed as starting compounds in the reaction can be represented by the following structural formula:

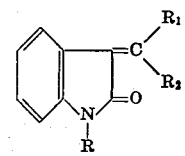

II wherein R, $R_1$, and $R_2$ are as defined above. The 3-(di-substitutedmethylene)oxindoles of Formula II are prepared by condensing an oxindole of the formula:

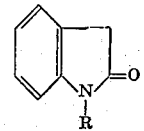

II wherein R is as defined above, with a ketone of the formula

wherein $R_1$ and $R_2$ are as defined above.

The condensation of an oxindole and a ketone can be effected by known methods, e.g., according to the methods described by Wahl et al., Bull. Soc. Chim. [5] 5, 653–666 (1938) and Windaus et al., Ber. 57, 1876 (1924). In general, the oxindole and ketone are reacted in the presence of a strongly basic secondary or tertiary amine with an excess of the ketone as the reaction medium. The reaction mixture is heated at a temperature in the range of about 150° C. about 250° C. When the ketone employed in the reaction boils at a temperature lower than about a desired reaction temperature, the heating can be effected in an autoclave. Representative secondary and tertiary amines suitable for catalyzing the reaction include piperidine, N-methylpiperidine, N-methylpiperazine, pyridine, triethylamine, and the like.

The desired 3-(di-substitutedmethylene)oxindole starting compounds of Formula II are recovered according to conventional methods, for example, concentrating the mixture, and purifying the product by solvent extraction and crystallization.

The 3',3'-disubstituted-spiro[indoline-3,2'-oxiran]-2-ones of this invention are pharmacologically active. For example, the compounds are active as sedatives, diuretics, anticonvulsants, and sleep potentiators, i.e., they prolong sleep induced by barbiturates and other sedatives and thus permit use of smaller doses of such sedatives. They are are active as enzyme inhibitors; illustratively, they inhibit γ-amino-butyric:α-ketoglutaric transaminase. They are useful for producing sedation, diuresis, sleep, and metabolic inhibition in mammals, birds, and other animals.

The following examples are illustrative of the process and products of the present invention, but are not to be construed as limiting.

Example 1.—Preparation of 3',3'-dimethylspiro[indoline-3,2'-oxiran]-2-one

A solution consisting of 6.8 g. (0.04 mole) of 3-isopropylideneoxindole, 600 ml. of methanol, 6.6 ml. (0.06 mole) of 30% hydrogen peroxide, and 40 ml. of 1 N sodium hydroxide was held at about 25° C. for 4 days. The reaction mixture was filtered, 2 ml. of acetic acid was added to the filtrate, and the filtrate was concentrated to dryness under reduced pressure. The residue thus obtained was recrystallized from a mixture of ethanol and water (20 parts ethanol to 80 parts water) to give 6.5 g. (87% yield) of 3',3'-dimethylspiro[indoline-3,2'-oxiran]-2-one having a melting point of 166° to 168° C.

Analysis: Calcd. for $C_{11}H_{11}NO_2$: C, 68.87; H, 5.85; N, 7.50. Found: C, 69.06; H, 5.82; N. 7.29.

I.R. NH: 3220; C=O: 1727, 1690; C=C: 1625, 1600, 1493; ring sub.: 760, 717, 690.

All the infrared determinations were carried out in a mineral oil mull; the results are expressed as reciprocal centimeters; and "sh" stands for shoulder.

U.V. 218 (2830); 248 f (5240); 260 f (4200); 268 f (2750); 302 (1500).

In all the ultraviolet determinations, the first value is the wave length in millimicrons and the second in parentheses is the molar absorptivity; "f" stands for flex and "sh" for shoulder; and the solvent was ethanol.

This compound when administered to rats produced an increase in excretion of urine.

Example 2.—Preparation of 1,3',3'-trimethylspiro[indoline-3,2-oxiran]-2-one

Part A: 1-methyl-3-isopropylideneoxindole.—A mixture consisting of 21.0 g. (0.14 mole) of 1-methyloxindole, 125 ml. of acetone, and 3.0 ml. of piperidine was heated and stirred in an autoclave at 190° C. for 17 hrs. The solution which resulted was concentrated to dryness under reduced pressure and the residue was recrystallized from ethanol to yield 24.5 g. (94% yield) of 1-methyl-3-isopropylidene-oxindole having a melting point of 72° to 74° C.

Analysis.—Calcd. for $C_{12}H_{13}NO$: C, 76.97; H, 6.99; N, 7.48. Found: C, 77.05; H. 7.39; N, 7.10.

I.R. C=C: 1687; C=C: 1627; aromatic C=C: 1604, 1590; aromatic sub.: 784, 743, 689.

U.V. 220 f (9350); 252 (29,400); 256 (29,400); 261.5 (34,050); 280 (4900); 291 (5900); 300 f (4900); 346 (1200).

Following the same procedure, but substituting 1-ethyloxindole, 1-propyloxindole, 1-isobutyloxindole, 1-hexyloxindole, and 1-octyloxindole for 1-methyloxindole, there were prepared 1-ethyl-, 1-propyl-, 1-isobutyl-, 1-hexyl-, and 1-octyl-3-isopropylideneoxindole, respectively.

Part B: 1,3',3'-trimethylspiro[indoline-3,2'oxiran]-2-one.—Following the procedure of Example 1, but substituting 1-methyl-3-isopropylideneoxindole for 3-isopropylideneoxindole, there was prepared 1,3',3'-trimethylspiro[indoline-3,2'-oxiran]-2-one having a melting point of 86° to 88° C.

Analysis.—Calcd. for $C_{12}H_{13}NO_2$: C, 70.91; H, 6.44; N, 6.89. Found: C, 70.49; H, 6.52; N, 6.77.

I.R. C=O: 1718, 1690 sh; C=C: 1615, 1575, 1493; aromatic sub.: 767, 752, 695.

U.V. 219 (29,200); 242 f (4900); 252 f (4700); 262 (4150); 273.5 f (2800); 302 (1300).

This compound when administered to mice produced sedation.

Following the same procedure, but substituting 1-ethyl-3-isopropylideneoxindole, 1-propyl-3-isopropylideneoxindole, 1-isobutyl-3-isopropylideneoxindole, 1-hexyl-3-isopropylidene-oxindole, and 1-octyl-3-isopropylideneoxindole for 1-methyl-3-isopropylideneoxindole, there were prepared 1-ethyl-3',3'-dimethyl-, 3',3'-dimethyl-1-propyl-, 3',3'-dimetyl-1-isobutyl-, 3',3'-dimethyl-1-hexyl-, and 3',3'-dimethyl-1-octylspiro-[indoline-3,2'-oxiran]-2-one, respectively.

Example 3.—Preparation of 3'-isopropyl-3'-methylspiro-[indoline-3,2'-oxiran]-2-one Part A: 3-(1,2-dimethylpropylidene)oxindole.—A mixture consisting of 26.6 g. (0.2 mole) of oxindole, 50 ml. of methyl isopropyl ketone, and 3.0 ml. of piperidine was heated and stirred in an autoclave at 190° C. for 17 hrs. The red solution which resulted was concentrated to drynes under reduced pressure, and the residue thus obtained was extracted with 4000 ml. of boiling technical hexane (Skellysolve B, a mixture of isomeric hexanes having a boiling range of 140° to 160° F.) and filtered. The filtrate was concentrated to a volume of 50 ml.; the concentrate was cooled, and the layer of technical hexane was decanted. The residual oil, thus obtained, was heated at the reflux temperature in methanol, in the presence of decolorizing charcoal, and filtered. The methanol was removed by evaporation to give 6.5 g. of 3-(1,2- dimethylpropylidene)oxindole as a reddish-purple semisolid.

Part B: 3' - isopropyl - 3' - methylspiro[indoline - 3,2'-oxiran]-2-one.—A 5.0 g. sample of the semisolid (Part A, above) was dissolved in 600 ml. of methanol, and 6.6 ml. of 30% hydrogen peroxide and 40 ml. of 1 N sodium hydroxide were added. The reaction mixture was allowed to stand at about 25° C. for 4 days. After filtering the mixture, the filtrate was neutralized with acetic acid, and the neutralized filtrate was concentrated to dryness under reduced pressure to obtain 3.1 g. of an oil. A 3.0 g. sample of the oil was dissolved in technical hexane and chromatographed over 300 g. of magnesium silicate (Florisil). The column was eluted with four 600-ml. portions of 3% acetone in technical hexane, four 600-ml. portions of 6% acetone in technical hexane, four 600-ml. portions of 9% acetone in technical hexane, and four 600-ml. portions of 12% acetone in techncal hexane. Fractions 6 through 10 were evaporated to obtain 1.77 g. of an oil, which on rechromatographing over 30 g. of neutral alumina using 5% acetone in technical hexane yielded 1.2 g. of 3'-isopropyl-3' - methylspiro-[indoline-3,2'-oxiran]-2-one as a viscous oil.

Analysis.—Calcd. for $C_{13}H_{15}NO_2$: C, 71.86; H, 6.95; N, 6.44. Found: C, 71.81; H, 7.27; N, 6.75. I.R. NH/OH: 3240; C=O: 1720; C=C: 1623, 1600. U.V. 218 (27,990); 248 (5360); 270f (2430); 302 (1455).

Example 4.—Preparation of 1-methyl-3',3'-diphenylspiro-[indoline-3,2'-oxiran]-2-one Part A: 1 - methyl - 3-diphenylmethyleneoxindole.—A mixture consisting of 22.0 g. (0.15 mole) of 1-methyloxindole, 27.3 g. (0.15 mole) of benzophenone, and 2.0 ml. of piperidine was heated and stirred in an autoclave at 190° C. for 20 hrs. The reaction mixture was thereby converted to a viscous oil which was extracted with 2000 ml. of boiling technical hexane. The extract was refrigerated at 0° C. for 20 hrs., and the crystals which formed were recovered on a filter; weight, 4.5 g. The residue remaining after the extraction with technical hexane was dissolved in hot methanol and the solution was cooled to effect crystallization. There was thus obtained 3.5 g. of crystalline product. The two crystalline products were combined and recrystallized from methanol to obtain 7.6 g. of 1-methyl-3-diphenylmethyleneoxindole having a melting point of 165.5° to 167.5° C.

*Analysis.*—Calcd. for $C_{22}H_{17}NO$: C, 84.85; H, 5.50; N, 4.49. Found: C, 84.89; H, 5.58; N, 4.55. I.R. C=O: 1698; C=C: 1605, 1618, 1490; aromatic sub.: 796, 734, 726, 703. U.V. 254 (18,000); 338 (10,450).

Part B: 1 - methyl - 3',3' - diphenylspiro[indoline - 3,2'-oxiran] - 2-one.—A mixture consisting of 5.2 g. (0.016 mole) of 1-methyl-3-diphenylmethyleneoxindole, 500 ml. of methanol, and 16.5 ml. of 1 N sodium hydroxide was warmed until a clear solution was obtained. The solution was treated with 2.7 ml. (.024 mole) of 30% hydrogen peroxide and allowed to stand at about 25° C. for 72 hrs. The 1 - methyl-3',3'-diphenylspiro[indoline-3,2'-oxiran]-2-one that formed was recovered on a filter; it had a melting point of 174° to 177° C. The filtrate was neutralized with acetic acid and concentrated to dryness under reduced pressure. The residue was recrystallized from methanol to obtain an additional 1.5 g. of 1-methyl-3',3'-diphenylspiro[indoline - 3,2'-oxiran]-2-one having a melting point of 174° to 177° C.

*Analysis.*—Calcd. for $C_{22}H_{17}NO_2$: C, 80.70; H, 5.23; N, 4.27. Found: C, 81.09; H, 5.50; N, 4.68. I.R. unsat. CH: 3000; C=O: 1726, 1700; C=C: 1615, 1585, 1495; aromatic sub.: 748, 737, 695, 685. U.V. 230 (23,900); 256f (9750); 274f (3750); 313 (1900); 344 (1100).

This compound when administered to mice produced sedation.

Example 5.—Preparation of 1-methyl-3'-phenyl-3'-(4-pyridyl)-spiro[indoline-3,2'-oxiran]-2-one Part A: 1- methyl - 3 -[phenyl(4 - pyridyl)methylene]oxindole.—A mixture consisting of 18.3 g. (0.1 mole) of 4-benzoylpyridine, 14.7 g. (0.1 mole) of 1-methyloxindole, and 1 ml. of N-methylpiperazine was heated with stirring at 170° C. for 16 hrs. The reaction mixture was then cooled and poured into water. The water was decanted and the residue was extracted with two 450-ml. portions of water. The residue thus obtained was then recrystallized two times from ethanol to give 5.0 g. of 1-methyl-3-[phenyl(4-pyridyl)methylene]oxindole having a melting point of 167° to 169° C.

*Analysis.*—Calcd. for $C_{21}H_{16}N_2O$: C, 80.74; H, 5.16; N, 8.97. Found: C, 80.26; H, 5.03; N, 8.85. I.R. C=O: 1700; C=N/C=C: 1624 (weak), 1605, 1540, 1490 C—N: 1100; aromatic sub.: 823, 780, 760, 750, 697. U.V. 258 (20,300); 323 (8050); 410 (1450).

Part B: 1 - methyl - 3' - phenyl - 3' - (4 - pyridyl) spiro[indoline - 3,2' - oxiran] - 2 - one.—A solution consisting of 5.0 g. (0.017 mole) of 1 - methyl - 3-[phenyl(4 - pyridyl)methylene]oxindole, 300 ml. of methanol, 4.0 ml. (0.034 mole) of 30% hydrogen peroxide, 10 ml. of water, and 1.4 g. (0.034 mole) of sodium hydroxide was allowed to react at about 25° C. for 60 hrs. The reaction mixture was filtered and the filtrate was concentrated to a small volume under reduced pressure. Water was added and the precipitate that formed was recovered on a filter. The filter cake was dispersed in ethyl acetate, and the suspension was heated at the reflux temperature for 1 hr. The liquid phase was decanted and diluted with technical hexane. After refrigeration for 16 hrs. at −5° C. the cold mixture was filtered. There was thus removed 100 mg. of yellow solid. The filtrate was diluted further with technical hexane and again refrigerated for 16 hrs. at −5° C., and filtered. The solid product was recrystallized from a mixture of technical hexane and ethyl acetate (80 parts technical hexane and 20 parts ethyl acetate). There was thus obtained 5.1 g. (92% yield) of 1 - methyl - 3' - phenyl - 3' - (4-pyridyl)spiro[indoline - 3,2' - oxirane] - 2 - one having a melting point of 140° to 180° C. After repeated recrystallization the melting point was unchanged.

*Analysis.*—Calcd. for $C_{21}H_{16}N_2O_2$: C, 76.81; H, 4.91; N, 8.53; O, 9.74. Found: C, 76.33; H, 5.08; N, 8.47; O, 10.12.

I.R. unsat. CH: 3020; C=O: 1725; C=N/C=C: 1615, 1600, 1558, 1500; aromatic sub.: 827, 800, 773, 760, 745, 702, 690.

U.V. 229 (27,780); 260 sh (8530); 268 sh (6100); 314 (1180).

This compound when administered to mice in conjunction with hexobarbital potentiated the hexobarbital induced sleep.

Example 6.—Preparation of 3'-methyl-3'-phenylspiro [indoline-3,2'-oxiran]-2-one

A solution consisting of 4.7 g. (0.02 mole) of 3-(1-phenylethylidene)oxindole, 300 ml. of methanol, 3.3 ml. (0.03 mole) of 30% hydrogen peroxide, and 20 ml. of 1 N sodium hydroxide was allowed to react at about 25° C. for 4 days. The reaction mixture was filtered; and the filtrate was neutralized with acetic acid before being concentrated to dryness under reduced pressure. The residue thus obtained was recrystallized two times from methanol to give 3' - methyl - 3' - phenylspiro[indoline - 3,2'-oxiran] - 2 - one having a melting point of 203° to 204.5° C.

*Analysis.*—Calcd. for $C_{16}H_{13}NO_2$: C, 76.47; H, 5.21; N, 5.57. Found: C, 76.34; H, 5.41; N, 5.66.

I.R. NH: 3130, 3060, 3010; C=O: 1721; C=C: 1622; aromatic C=C: 1603, 1500; aromatic sub.: 782, 757, 740, 730, 690.

U.V. 259 f (4800); 265 f (3900); 273 f (2300); 305 (1600).

Example 7

Part A: Following the procedure of Example 2, Part A, but substituting ethyl isopropyl ketone, methyl butyl ketone, diethyl ketone, methyl isoamyl ketone, dipropyl ketone, diisobutyl ketone, dihexyl ketone, ethyl octyl ketone, and dioctyl ketone for acetone, there were prepared 1 - methyl - 3 - (1 - ethyl - 2 - methylpropylidene) oxindole, 1 - methyl - 3 - (1 - methylpentylidene) oxindole, 1 - methyl - 3 - (1 - methylpropylidene) oxindole, 1 - methyl - 3 - (1,4 - dimethylpentylidene) oxindole, 1 - methyl - 3 - (1 - propylbutylidene)oxindole, 1 - methyl - 3 - (1 - isobutyl - 3 - methylbutylidene) oxindole, 1 - methyl - 3 - (1 - hexylheptylidene)oxindole, 1 - methyl - 3 - (1 - ethylnonylidene)oxindole, and 1-methyl - 3 - (1 - octylnonylidene)oxindole, respectively.

Part B: Following the procedure of Example 2, Part B, but substituting
1-methyl-3-(1-ethyl-2-methylpropylidene)oxindole,
1-methyl-3-(1-methylpentylidene)oxindole,
1-methyl-3-(1-methylpropylidene)oxindole,
1-methyl-3-(1,4-dimethylpentylidene)oxindole,
1-methyl-3-(1-propylbutylidene)oxindole,
1-methyl-3-(1-isobutyl-3-methylbutylidene)oxindole,
1-methyl-3-(1-hexylheptylidene)oxindole,
1-methyl-3-(1-ethylnonylidene)oxindole and 1-methyl-3-(1-octylnonylidene)oxindole for 1-methyl-3-isopropylideneoxindole,
there were prepared 1-methyl-3'-ethyl-3'-isopropylspiro [indoline-3,2'-oxiran]-2-one,
1,3'-dimethyl-3'-butylspiro[indoline-3,2'-oxiran]-2-one,
1-methyl-3'-3'-diethylspiro[indoline-3,2'-oxiran]-2-one,
1,3'-dimethyl-3'-isoamylspiro[indoline-3,2'-oxiran] 2-one,
1-methyl-3'-3'-dipropylspiro[indoline-3,2'-oxiran]-2-one,
1-methyl-3'-3'-diisobutylspiro[indoline-3,2'-oxiran]-2-one,
1-methyl-3',3'-dihexylspiro[indoline-3,2'-oxiran]-2-one,
1-methyl-3'-ethyl-3'-octylspiro[indoline-3,2'-oxiran]-2-one, and 1-methyl-3',3'-dioctylspiro[indoline-3,2'-oxiran]-2-one, respectively.

Example 8

Part A: Following the procedure of Example 5, Part A, but substituting
benzyl 1-naphthyl ketone,
dibenzyl ketone,
p-anisyl methyl ketone,
methyl 1-naphthyl ketone,
isobutyl phenyl ketone,
propyl 2-pyridyl ketone,
1-methylbutyl 2-pyridyl ketone,
phenyl 3-pyridyl ketone,
3-pyridyl m-tolyl ketone, and
mesityl 3-pyridyl ketone for 4-benzoylpyridene,
there were prepared 1-methyl-3-[benzyl(1-naphthyl)methylene]oxindole,
1-methyl-3-(dibenzylmethylene)oxindole,
1-methyl-3-(1-p-anisylethylidene)oxindole,
1-methyl-3-[1-(1-naphthyl)ethylidene]oxindole,
1-methyl-3-(α-isobutylbenzylidene)oxindole
1-methyl-3-[1-(2-pyridyl)butylidene]oxindole,
1-methyl-3-[1-(2-pyridyl)-2-methylpentylidene]oxindole,
1-methyl-3-[α-(3-pyridyl)benzylidene]-oxindole,
1-methyl-3-[(m-tolyl)(3-pyridyl)methylene]oxindole, and
1-methyl-3-[(3-pyridyl)mesitylmethylene]oxindole, respectively.

Part B: Following the procedure of Example 5, Part B, but substituting 1-methyl-3-[benzyl(1-naphthyl)methylene] oxindole, 1-methyl-3-(dibenzylmethylene)oxindole, 1-methyl-3-(1-p-anisylethylidene)oxindole, 1-methyl-3-[1-(1-naphthyl) ethylidene]-oxindole, 1-methyl-3-(α-isobutylbenzylidene)oxindole, 1-methyl-3-[1-(2-pyridyl, butylidene]oxindole, 1-methyl-3-[1-(2-pyridyl)-2-methylpentylidene]oxindole, 1-methyl-3-[α-(3-pyridyl)benzylidene]oxindole, 1-methyl-3-[(m-tolyl)(3-pyridyl)methylene]-oxindole, and 1-methyl-3-[(3-pyridyl)mesitylmethylene]oxindole for 1-methyl-3-[phenyl(4-pyridyl)methylene]oxindole, there were prepared 1-methyl-3'-benzyl-3'-(1-naphthyl)spiro[indoline-3,2'-oxiran]-2-one, 1 methyl-3',3'-dibenzylspiro[indoline-3,2'-oxiran]-2-one, 1,3'-dimethyl-3'-(p-anisyl)spiro[indoline-3,2'-oxiran]-2-one, 1,3'-dimethyl-3'-(1-naphthyl)spiro[indoline-3,2'-oxiran]-2-one, 3'-isobutyl-1-methyl-3'-phenylspiro[indoline-3,2'-oxiran]-2-one, 1-methyl-3'-propyl-3'-(2-pyridyl)spiro-[indoline-3,2'-oxiran]-2-one, 1-methyl-3'-(1-methylbutyl)-3'-(2-pyridyl)spiro[indoline-3,2'-oxiran]-2-one, 1-methyl - 3' - phenyl - 3' - (3 - pyridyl)spiro[indoline-3,2'-oxiran]-2-one, 1-methyl-3'-(3-pyridyl)-3'-(m-tolyl)spiro[indoline-3,2'-oxiran]-2-one, and 1-methyl-3'-mesityl-3'-(3-pyridyl)spiro[indoline-3,2'-oxiran]-2-one, respectively.

I claim:
1. 3',3' - disubstituted-spiro[indoline - 3,2' - oxiran]-2-ones of the formula:

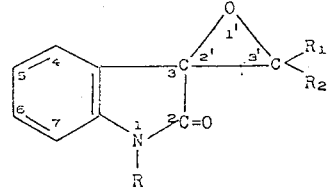

where R is selected from the group consisting of hydrogen and lower-alkyl; and $R_1$ and $R_2$ are selected from the group consisting of the lower-alkyl, phenyl, lower-alkylphenyl, halophenyl, lower-alkoxyphenyl, benzyl, α-methylbenzyl, phenethyl, and pyridyl.

2. 3',3'-di-lower-alkylspiro[indoline-3,2'-oxiran]-2-one.
3. 3',3'-dimethylspiro[indoline-3,2'-oxiran]-2-one.
4. 3'-isopropyl-3'-methylspiro[indoline - 3,2' - oxiran]-2-one.
5. 1,3',3' - tri-lower-alkylspiro[indoline-3,2'-oxiran]-2-one.
6. 1,3',3'-trimethylspiro[indoline-3,2'-oxiran]-2-one.
7. 1 - lower-alkyl - 3',3' - disubstitutedspiro[indoline-3',2'-oxiran]-2-one according to claim 1.
8. 1 - methyl-3',3'-diphenylspiro[indoline-3,2'-oxiran]-2-one.
9. 3' - lower-alkyl - 3' - substitutedspiro[indoline - 3'2'-oxiran]-2-one according to claim 1 wherein R is hydrogen.
10. 3'-methyl - 3' -phenylspiro[indoline - 3,2' - oxiran-2-one.
11. 1-lower-alkyl-3' - substituted[aryl] - 3-pyridylspiro[indoline-3,2'-oxiran]-2-one according to claim 1.
12. 1-methyl - 3' - phenyl-3'-(4-pyridyl)spiro[indoline-3,2'-oxiran]-2-one.

References Cited

UNITED STATES PATENTS 3,053,857  9/1962  Payne _____ 260—348
3,242,218  3/1966  Miller _____ 260—348.5 XR

OTHER REFERENCES

Arndt et al. Chem. Ber. J.G. 62 (1929) pp. 44–49.
Schonberg Chem. Ber. J.G. 96 (1963), pp. 1328–1329.
Burger Medicinal 2nd Ed. Interscience, pp. 78 RS 403 (1960)

HENRY R. JILES, *Primary Examiner.*
A. L. ROTMAN, *Assistant Examiner.*